(12) United States Patent
Bregman et al.

(10) Patent No.: US 11,842,188 B2
(45) Date of Patent: Dec. 12, 2023

(54) CONTINUOUS INTEGRATION AND DEPLOYMENT PIPELINE SELECTION BASED ON DYNAMIC MAPPING

(71) Applicant: Red Hat, Inc., Raleigh, NC (US)

(72) Inventors: Arie Bregman, Gan Yanve (IL); Steve Mattar, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/452,941

(22) Filed: Oct. 29, 2021

(65) Prior Publication Data

US 2023/0138602 A1    May 4, 2023

(51) Int. Cl.
G06F 9/44 (2018.01)
G06F 8/71 (2018.01)
G06F 11/36 (2006.01)
G06F 8/36 (2018.01)

(52) U.S. Cl.
CPC .......... *G06F 8/71* (2013.01); *G06F 8/36* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 7,603,660 B2 | 10/2009 | Davia et al. | |
| 9,652,509 B2 | 5/2017 | Shani et al. | |
| 10,310,969 B2 | 6/2019 | Bhattacharjee et al. | |
| 10,733,087 B2 | 8/2020 | Weiner et al. | |
| 10,860,464 B2 | 12/2020 | Strachan et al. | |
| 11,144,289 B1* | 10/2021 | Hwang | G06N 20/00 |
| 11,231,922 B2* | 1/2022 | Ahuja | G06F 8/65 |
| 2017/0180487 A1* | 6/2017 | Frank | G06F 11/3688 |
| 2022/0197621 A1* | 6/2022 | Plewa | G06F 8/71 |

OTHER PUBLICATIONS

Sriniketan Mysari et al., "Continuous Integration and Continuous Deployment Pipeline Automation Using Jenkins Ansible", Feb. 2020 (Year: 2020).*
Wilen, Juhani, Code Change Based Selective Testing in Continuous Intergration Environment, http://jultka.oulu.fi/files/nbnfioulu-201806062460.pdf, Faculty of Information Technology and Electrical Enginerring, University of Oulu, May 2018, 65 pages.
Bridgwater, Adrian, "CI/CD Series OverOps: How 'Code Quality-Gates' Optimise the Pipeline", https://www.computerweekly.com/blog/CW-Developer-Network/CI-CD-series-OverOps-How-code-quality-gates-optimise-the-pipeline, Nov. 13, 2019, 4 pages.

* cited by examiner

*Primary Examiner* — Wei Y Zhen
*Assistant Examiner* — Lanny N Ung
(74) *Attorney, Agent, or Firm* — Lowenstein Sandler LLP (57) ABSTRACT

For each continuous integration and continuous delivery/deployment (CI/CD) pipeline of a plurality of CI/CD pipelines created for a project, a data structure reflecting an execution configuration of the respective CI/CD pipeline is created. A request to submit a code change to the project is received. Among the plurality of CI/CD pipelines, at least one CI/CD pipeline having the data structure that matches the code change to the project is identified. The code change to the project on the at least one identified CI/CD pipelines is executed.

16 Claims, 7 Drawing Sheets

```
For each continuous integration and continuous delivery/deployment (CI/CD) pipeline
of a plurality of CI/CD pipelines created for a project, create a data structure reflecting
an execution configuration of the respective CI/CD pipeline. 310
```

```
Store, to a memory device, each data structure of the plurality of CI/CD pipelines. 320
```

```
Receive a request to submit a code change to the project. 330
```

```
Identify, among the plurality of CI/CD pipelines, at least one CI/CD pipeline having
the data structure that matches the code change to the project. 340
```

```
Execute the code change to the project on the at least one identified CI/CD pipelines.
350
```

FIG. 3

For each continuous integration and continuous delivery/deployment (CI/CD) pipeline of a plurality of CI/CD pipelines created for an Ansible project, create a data structure based on a results of a dry execution of the respective CI/CD pipeline. 410

Store, to the memory device, each data structure of the plurality of CI/CD pipelines. 420

Receive, by the processing device, a request to submit a change to at least one of: a line of the project, a task of the project, or a playbook of the project. 430

Identify, among the plurality of CI/CD pipelines, at least one CI/CD pipeline having the data structure that includes the at least one of: the line of the project, the task of the project, or the playbook of the project to be changed. 440

CONTINUOUS INTEGRATION AND DEPLOYMENT PIPELINE SELECTION BASED ON DYNAMIC MAPPING

TECHNICAL FIELD

The present disclosure is generally related to build management, and more particularly, to effective CI/CD pipeline selection based on dynamic CI/CD pipeline mapping.

BACKGROUND

In computer program development, continuous integration is the practice of merging developer working copies of computer program code for an application into a shared mainline code base, generally, several times a day. With continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed periodically, or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for selecting effective continuous integration and continuous delivery (CI/CD) pipeline based on dynamic CI/CD pipeline mapping. CI/CD is a method to deliver applications to customers by introducing automation into the stages of software (e.g., application) development. CI/CD is a solution to the problems integrating new code can cause for development and operations teams. CI/CD introduces ongoing automation and continuous monitoring throughout the software lifecycle, from integration and testing phases to delivery and deployment phases. Taken together, this sequence of operations are often referred to as a "CI/CD pipeline" and are supported by development and operations ("DevOps") teams working together in an agile way with either a DevOps or Site Reliability Engineering (SRE) approach.

Continuous integration (CI) generally refers to an automation process for developers. Successful CI means new code changes can be regularly built, tested, and merged to a shared repository. CI provides a solution to the problem of having too many potentially conflicting branches of an application in development. The "CD" in CI/CD stands for continuous delivery and/or continuous deployment, which are related concepts that sometimes get used interchangeably. Both continuous delivery and continuous deployment generally refer to automating further stages of the CI/CD pipeline.

For example, continuous delivery generally means that a developer's software changes are automatically bug tested and uploaded to a repository, where they can then be deployed to a live production environment by the operations team. Continuous delivery provides a solution to the problem of poor visibility and communication between developer and business teams. To that end, the purpose of continuous delivery is to ensure that it takes minimal effort to deploy new code.

Continuous deployment can refer to automatically releasing a developer's changes from the repository to production, where it is usable by customers. Continuous deployment addresses the problem of overloading operations teams with manual processes that slow down delivery, and builds on the benefits of continuous delivery by automating the next pipeline stage ("stage") in the CI/CD pipeline. A stage includes a set of tasks or jobs where, if every task in a given stage succeeds, then the CI/CD pipeline can transition to the next stage. If a task in the given stage fails, then CI/CD pipeline can prematurely terminate or, in some cases, move to the next stage.

Examples of pipeline stages include a build stage, a test stage, a release stage, and a deploy stage. The build stage can include a compile task that compiles software (e.g., application) to obtain a build. The test stage can include one or more testing tasks that perform one or more automated tests on the build to ensure that the build is ready for release and deployment. After the test stage, the release stage can include a release task to automatically deliver the build to a repository. The deploy stage can include a deploy task to automatically deploy the build into production.

When executed, a CI/CD pipeline implements a workflow to automatically perform the stages described above. The sequence of operations can include a sequence of commands, conditional and/or unconditional execution control transfers, etc. For example, when creating a CI/CD pipeline definition, a location of a test directory in a project can be identified, and then the CI/CD pipeline definition can be created automatically to execute one or more tests from the test directory.

Accordingly, when changes are made to the code (e.g. a project), a CI/CD pipeline processes the changes made to the code (i.e., performs, for example, one or more testing tasks according to the CI/CD pipeline definition). Effectiveness of the CI/CD pipeline is based on whether all the testing tasks associated with the CI/CD pipeline are performed on the changes to the project. Accordingly, as projects become increasingly more complex (e.g., numerous components and/or services), more testing tasks are needed to ensure that all aspects of the projects are properly tested to maintain functionality. Maintaining a test directory with all the necessary testing tasks for the project and running each testing task in response to a change to the project can be time consuming for the CI/CD system.

Typically, to prevent running each testing task in response to a change to the project, the CI/CD system maintains a testing task mapping which maps portions of the project (e.g., a specific module of the project) to a particular testing task located in the test directory. Accordingly, depending on the embodiment, a CI/CD pipeline may be selected from a static list of effective CI/CD pipelines for processing a change to the project. The effective CI/CD pipeline refers to a CI/CD pipeline that includes all the testing task necessary to properly test the portions of the changed project. The list of effective CI/CD pipelines may include a subset of CI/CD pipelines of the CI/CD system that would be sufficient to cover all possible changes to the project based on the testing task mapping. Once a change to the project is submitted, the CI/CD system can determine select a CI/CD pipeline from the static list of effective CI/CD pipelines to execute the change to the project.

However, with the overwhelming amount of CI/CD pipelines in any given CI/CD system, it is unlikely that a static list containing a subset of the CI/CD pipelines (e.g., 5 CI/CD pipelines) for the project could effectively cover every possible change to the project. For example, a repository of the project based on Ansible programming language may contain multiple playbooks. Playbooks refers to an Ansible playbook which is a list of tasks that automatically execute against hosts. Each playbook is ran with different conditions and variables which may be associated with different testing tasks. Thus, it is unlikely that the static list of effective CI/CD pipelines could effectively test all combinations of changes to the playbooks of the project. Additionally, due to the flexibility of CI/CD systems, DevOps may remove, create, and modify CI/CD pipelines to test updated and/or different scenarios to accommodate changes to the project that were not previously anticipated. Thus, maintaining the static list of effective CI/CD pipelines becomes increasingly difficult requiring constant coordination to determine which new or modified CI/CD pipelines will be designated as an effective CI/CD pipeline.

Aspects of the present disclosure address the above-noted and other deficiencies by determining whether a CI/CD pipeline is suitable to test a change to a project based on an execution configuration of the CI/CD pipeline. In an illustrative example, creation or updating of a CI/CD pipeline may involve generating, based on a dry execution of the CI/CD pipeline, a data structure reflecting an execution configuration of the CI/CD pipeline. Identifiers of the data structure and the associated CI/CD pipeline may be stored in a CI/CD pipeline mapping table.

Responsive to submission of a change to a project, a change to the project may be analyzed to determine a level of change to the project (e.g., a file level change, a block level change, or a line level change). Based on the level of change, at least one CI/CD pipeline is selected from the CI/CD pipeline mapping table by comparing the change to the project with each data structure. For example, if the level of change is file level, any CI/CD pipeline that is designated to execute the file is suitable to test the change.

The change to the project may be executed on the at least one CI/CD pipeline. In some embodiments, a predetermined number of CI/CD pipelines is selected from the CI/CD pipeline mapping table to run the change to the project. If no there are no CI/CD pipelines selected from the CI/CD pipeline mapping table to run the change to the project, the user is notified that additional and/or updated CI/CD pipelines are needed to accommodate the change to the project.

Advantages of the present disclosure include, but are not limited to, improving selection of CI/CD pipelines and preventing constant maintenance of static list containing effective CI/CD pipelines used to cover unspecified changes to the project, thus ensuring successful testing of each change to the project.

Figure 1:
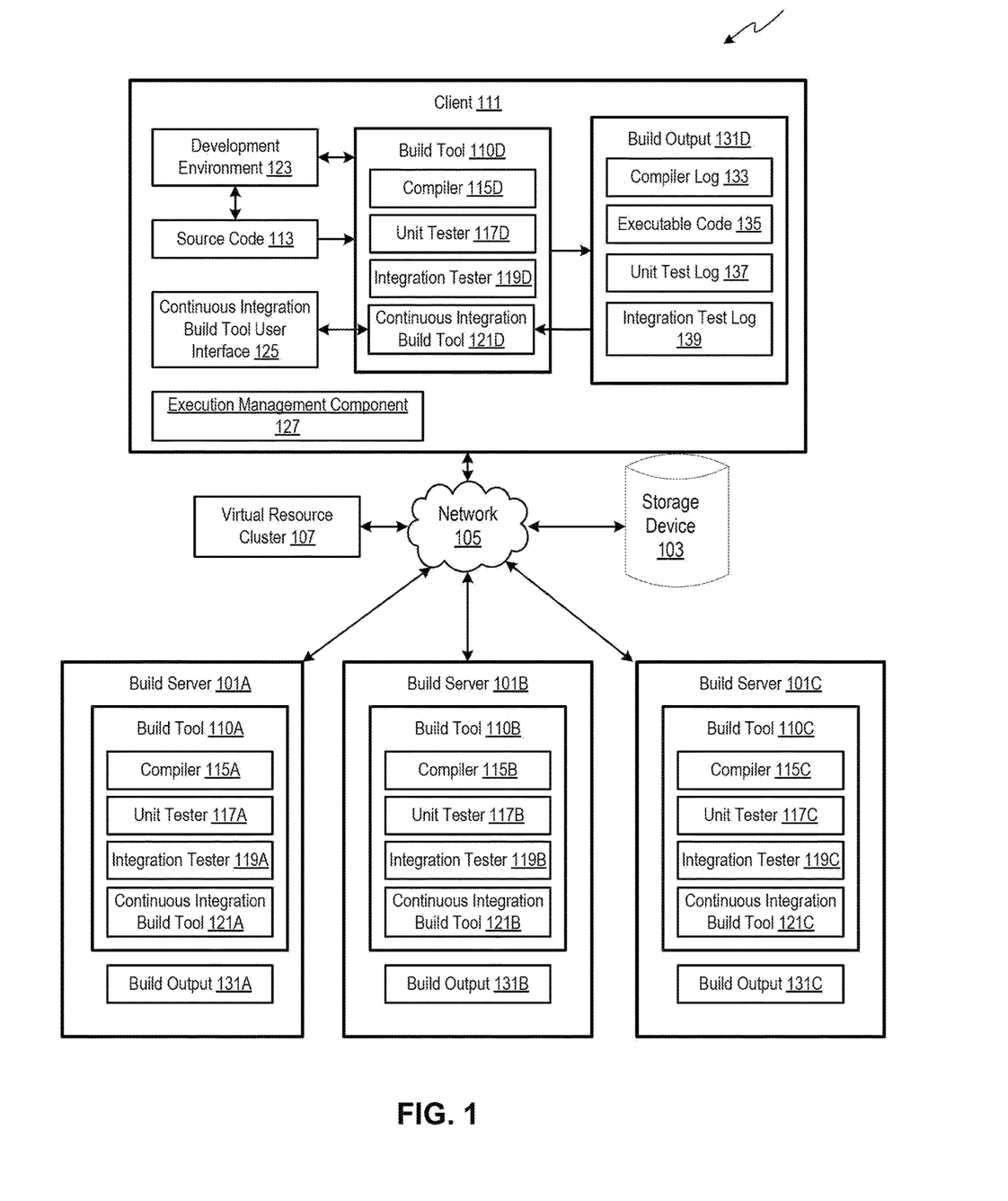
FIG. 1 depicts a high-level block diagram of an example computing environment that includes an execution management component, in accordance with one or more aspects of the present disclosure.

FIG. 1 depicts a high-level block diagram of an example computing environment 100 that includes an execution management component 127, in accordance with one or more aspects of the present disclosure. The computing environment 100 may provide build management services that include executing build operations to perform builds of source code 113 to produce build output 131A-D. The builds may be performed in accordance with instructions provided by the continuous integration build tool user interface 125. The computing environment 100 may include build servers 101A-C for running the sets of operations for providing builds in a continuous integration environment. The builds may utilize source code 113, e.g., of an application that is being developed. An application may be, for example, a web application, a desktop application, a browser application, etc. An application may be a messaging application, a video application, a social networking application, video sharing application, photo sharing application, chat application, mobile application of a content provider or any combination of such applications. An application may be a computationally large or data-intensive application, such as a forecasting application, a modeling application, a data analysis application, etc. The build servers 101A-C may be hosted on any type of computing node, which may be a virtualized or bare metal computing device such as a server computer, a desktop computer, a portable computing device such as, and not limited to, netbooks, laptop computers, and the like.

Figure 2A:
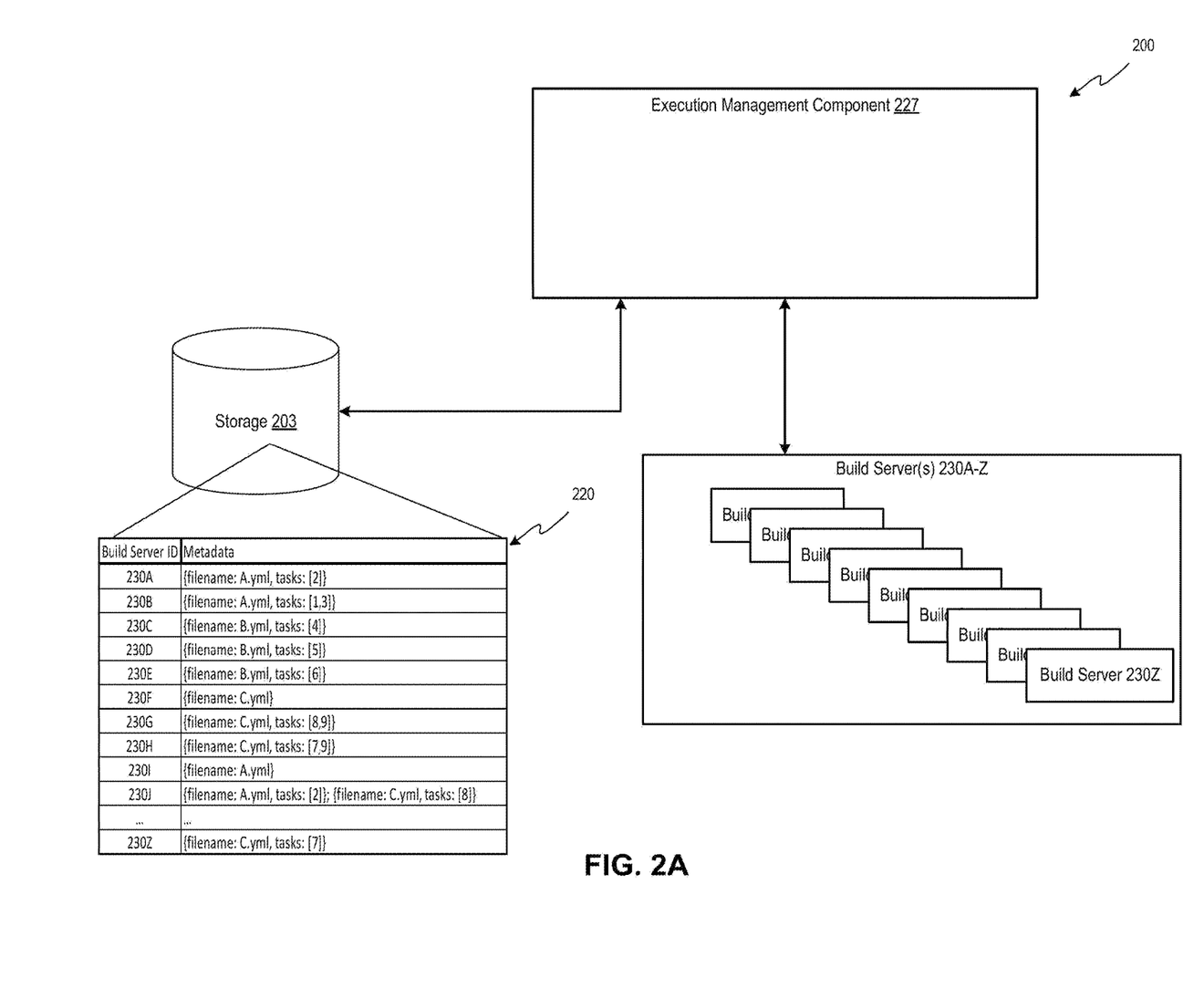
FIG. 2A-2B depicts a block diagram illustrating dynamically generating a CI/CD pipeline mapping table and selecting an effective CI/CD pipeline, in accordance with one or more aspects of the present disclosure.

Build tools 110A-D may be located on client 111, on build servers 101A-C, or both. Each build tool 110A-D may execute a set of operations to provide the build of the mainline code. The mainline code may be the base of a project on which development progresses. The set of operations may include compiling the code, testing the code when the code is compiled, testing isolated code when the code is added to the larger mainline code base, and performing continuous build operations e.g., performing a build a periodic intervals or in response to user requests, and presenting information about the status of executing builds and the results of completed builds. A software build job (e.g., a pipeline of one or more stages) can be executed by build tool 110A-D. Client 111 may further include execution management component 127 to dynamically generate a CI/CD pipeline mapping table to facilitate selection of effective CI/CD pipelines for execution of a change to a project. Execution management component 127 will be explained in greater detail with references to FIG. 2 below.

Users, such as computer program development team members, may use a development environment 123 to submit source code 113 to the build tool 110D located on client 111 and/or to one or more build tools 110A-C located on build servers 101A-C. Users may submit source code to build tools 110A-C located on the build servers 101A-C from client 111 via network 105. Build tool 110A-D or other tool (e.g., a version control tool) may merge the submitted source code 113 with a shared mainline code base that is being stored and maintained by build server 101A-C. Users may submit source code 113 to any of the build tools 110A-D on a daily (or more frequent) basis, and request execution of a build process for the submission.

A client machine 111 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 may be a private network (e.g., a local area network (LAN), a wide area network (WAN), intranet, or other similar private networks) or a public network (e.g., the Internet).

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid state drives (SSD)), other data storage devices, or a combination thereof. In yet another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels.

Build tool 110A-D may include a compiler 115A-D to compile computer source code 113 into executable code 135, and to generate other build output 131A-D, such as a compiler log 133 that contains output describing progress and results of the compilation process. Build tool 110A-D may include a unit tester 117A-D and an integration tester 119A-D for running automated tests on artifacts (e.g., tangible by-products produced during software development). Unit tester 117A-D may test that the individual functions in the source code 113 or executable code 135 work properly and generate unit test log 137 that contains output(s) describing progress and results of the unit tester 117A-D. Integration tester 119A-D may test the executable code 135 in an environment in which the executable code 135 is expected to be executed by users. Build tool 110A-D may include continuous integration build tool 121A-D for performing continuous build operations (e.g., performing a build at periodic intervals or in response to user requests), and presenting information about the status of executing builds and the results of completed builds. Continuous integration build tool 121A-D may start a build, e.g., by executing compiler 115A-D, unit tester 117A-D, and integration tester 119A-D in accordance with a build configuration script that contains instructions for compiling the source code and testing the resulting executable code 135. Continuous integration build tool 121A-D may monitor build output 131A-D and display progress information, such as the stage of the build (e.g., compiling, unit testing, or integration testing), the status of an executing build (e.g., how many files have been compiled, how many tests have passed, and how many tests have failed). Continuous integration build tool 121A-D may detect the completion of a build by receiving a result value from compiler 115A-D, unit tester 117A-D, and integration tester 119A-D, or by detecting particular text in the build output logs, for example.

Continuous integration build tool 121A-D may generate an integration test log 139 containing information describing the progress of the operations performed by the continuous integration build tool 121A-D.

Continuous integration build tool user interface 125 may enable a user to start one or more active build jobs. Continuous integration build tool user interface 125 presents an active build list, a build queue list, and a jobs list. The jobs list includes one or more job representations, which are user-interface representations of jobs that build tool 110A-D can execute to perform builds. Instructions can be provided to build tools 110A-D (e.g., CI/CD pipelines) in the form of build files, such as build scripts or declarative descriptions of the files to be built in terms of files from which they are built. A job can be executed by build tool 110A-D. A job can include a set of stages, which may be executed sequentially. The stages can include, for example, compile, test, and deploy stages. The compile stage may translate source code to executable code, the test stage may perform tests to verify that the executable code operates correctly, and the deploy stage may install the executable code on host machines or nodes.

The execution management component 127 may generate, in response to creation of a CI/CD pipeline definition, a data structure associated with the CI/CD pipeline. The data structure may store certain metadata specifying the execution properties and/or an execution configuration of the CI/CD pipeline. Depending on the embodiment, the execution properties and/or execution configuration is based on the CI/CD pipeline configuration configured during creation of the CI/CD pipeline. The data structure associated with the CI/CD pipeline created by the execution management component 127 can specify the execution configuration in detail with respect to the CI/CD pipeline. In particular, the data structure is generated according to the underlying programming language of the CI/CD pipeline (e.g., Declarative, Scripted Pipeline (DSL)). To generate data structure associated with the CI/CD pipeline, the execution management component 127 may perform a dry execution of the CI/CD pipeline in which the result of the dry execution would represent the execution configuration. The dry execution refers to a process of a executing the CI/CD pipeline without a project to determine the values of variables (e.g., execution configuration). For example, if the CI/CD pipeline is configured to execute Ansible projects including playbooks, the execution management component 127 would perform a dry execution of the CI/CD pipeline and the resulting data structure (e.g., metadata) may include the following items (as shown in FIG. 1 depicting a pipeline with an execution configuration):

```
{
  file_name: X.yml;
  tasks: [1, 2, 3, ]
}
```

In particular, the playbook typically corresponds to a file that contains the series of task that are included in a playbook. Accordingly, when performing a dry execution the name or file name of the file containing the task of the playbook is determined. Once the name or file name corresponding to the playbook is determined, the dry execution determines each task contained in the file which contains a corresponding identification, for example, a number. Therefore, after the dry execution the file name of the playbook is included in the data structure first followed by any corresponding tasks associated with the playbook. If the data structure associated with the a defined CI/CD pipeline already exists, the execution management component 127, in response to an update to the defined CI/CD pipeline, may update the data structure associated with the CI/CD pipeline to maintain an accurate representation of the execution configuration of the CI/CD pipeline. To update the data structure associated with the CI/CD pipeline, the execution management component 127 may perform another dry execution of the updated CI/CD pipeline and update the data structure with the results of the dry execution of the updated CI/CD pipeline. Depending on the embodiment, the data structure may be updated by overwriting the data structure with the results of the dry execution of the updated CI/CD pipeline. In some embodiments, portions of the data structure that are different then at least one portion of the results of the dry execution of the updated CI/CD pipeline may be updated or changed. The execution management component 127 may store the CI/CD pipeline and its corresponding data structure in a mapping table (e.g., CI/CD pipeline mapping table) in storage 103.

Responsive to submission of a change to a project (or a change request to a project), the execution management component 127 may analyze the change to the project to determine a level of change to the project. To determine the level of change, the execution management component 127 may analyze the change to the project to determine the level of change within the project. Additionally, the execution management component 127 may identify a programming language of the project. Identifying the programming language of the project provides the execution component 127 with further information regarding determining the level of changes to the project. For instance, if the execution management component 127 determines that the programming language of the build is Ansible, the execution management component 127, when determining the level of change to the build, would consider blocks of lines rather than lines individually. Further, the level of changes with respect to Ansible as the programming language includes file level (e.g., playbook level), block level (e.g., task level), and line level. File level refers to changes directed towards a file of the project (e.g., addition or deletion of a file of the build). Block level refers to changes directed towards blocks of lines of the build (e.g., deletion, addition, and/or modification of at least one line associated with a block of the build). Line level refers to changes directed towards at least one line that is not associated with a block of lines of the build (e.g., deletion, addition, and/or modification of at least one line not associated with a block of the build).

Upon determining the level of change associated with submission of the change to the project, the execution management component 127 identifies a CI/CD pipeline to execute the change to project. The execution management component 127 may query the CI/CD pipeline mapping table and compares the level of change with each data structure of the CI/CD pipelines in the CI/CD pipeline mapping table. According to the level of change, a CI/CD pipeline is selected from the CI/CD pipeline mapping table to determine whether the change to the project satisfies the data structure of the respective CI/CD pipeline. To determine whether the change to the project satisfies the respective data structure, the level of the change to the project is compared to data at each level portion of the data structure until a match is found. For example, if the change to the project is removal of file A, the level of change to the project is file level, the execution management component 127 would compare the change to the build with each data structure associated with a CI/CD pipeline in the CI/CD pipeline mapping table to determine whether at the file level the data structure contains file A. In another example, if the change to the project is modify block 3, the level of change is block level, the execution management component 127 would compare the change to the project with each data structure associated with a CI/CD pipeline in the CI/CD pipeline mapping table to determine whether at the block level (e.g., more granular level) the data structure contains block 3. In yet another instance, if the change to the project is modify line 23, the level of change is line level, the execution management component 127 would compare the change to the project with each metadata associated with a CI/CD pipeline in the CI/CD pipeline mapping table to determine whether at the line level (e.g., even more granular level) the data structure contains line 23. Accordingly, if the level of change satisfies the metadata of at least one CI/CD pipeline of the CI/CD pipeline mapping table, the execution management component 127 may set the CI/CD pipeline to execute the change to the project. In some embodiments, the execution management component 127 may execute the change to the project on the CI/CD pipeline.

Depending on the embodiment, the execution management component 127 may set a predetermined number of CI/CD pipelines to execute the changes to the project. Depending on the embodiment, the predetermined number of CI/CD pipelines to execute may be determined by users of the CI/CD system. For example, the execution management component 127 may set the predetermined number of CI/CD pipelines to 2. Accordingly, if the execution management component 127 determines there are at least 10 CI/CD pipelines in which the level of change satisfies the data structure, the execution management component 127 may set only 2 of CI/CD pipelines of the at least 10 CI/CD pipelines to execute the change to the project. In some embodiments, the execution management component 127 may return the first 2 CI/CD pipelines from the CI/CD pipeline mapping table in which the level of change satisfies the data structure.

In some embodiments, the level of change may not satisfy any data structure of the CI/CD pipelines in the CI/CD pipeline mapping table. Accordingly, the execution management component 127 may notify the user that there are currently no CI/CD pipelines configured to properly test the change to the project necessitating either additional CI/CD pipelines and/or updates to existing CI/CD pipelines.

Figure 2B:
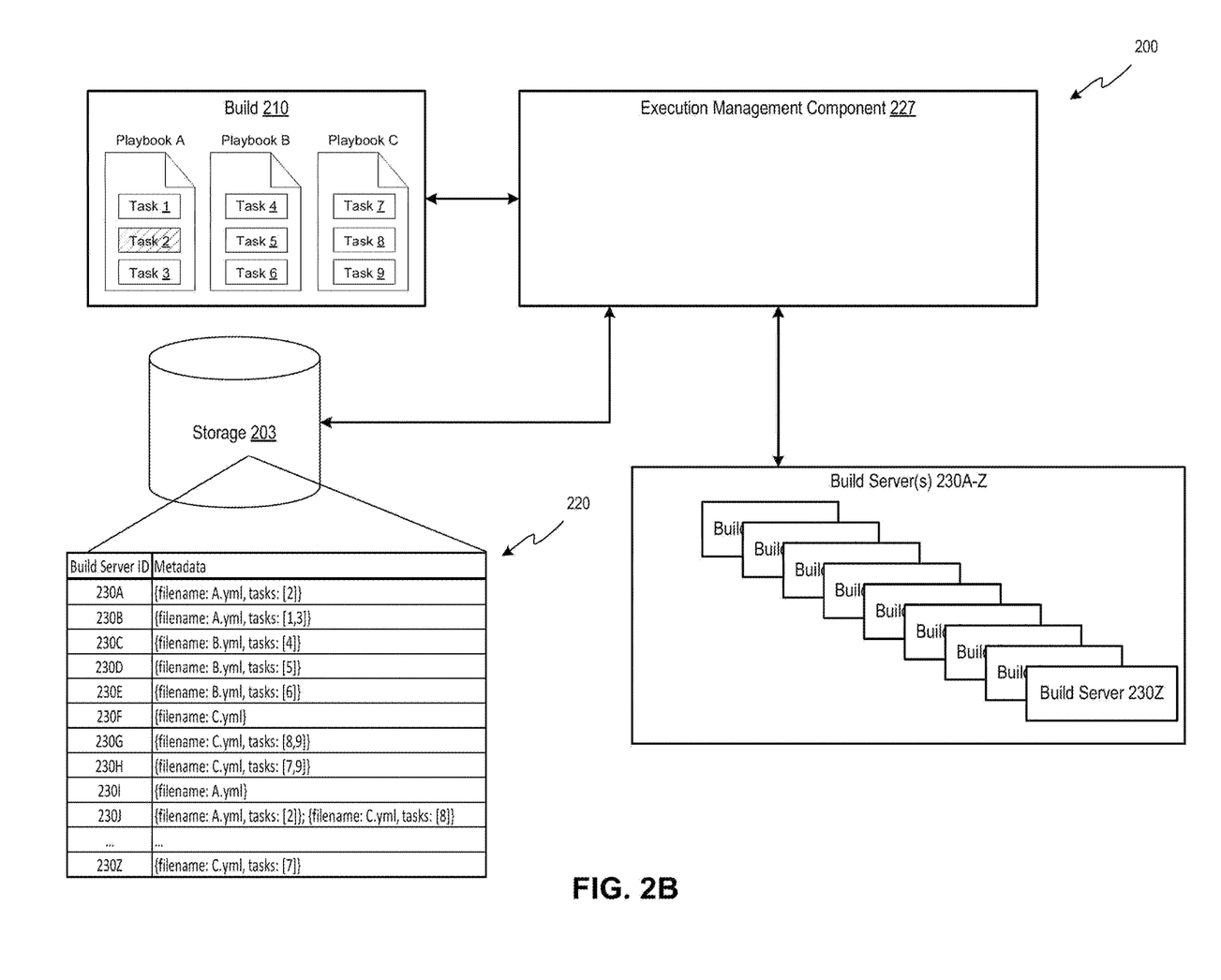

FIG. 2A-2B illustrates system 200 generating a dynamic CI/CD pipeline mapping for effective CI/CD pipeline selection, in accordance with one or more aspects of the present disclosure. In the example shown, FIG. 2A may include an execution management component 227, a storage 203, and build servers (e.g., CI/CD pipelines) 230A-Z.

Initially, as each build server 230A-Z is added, a CI/CD pipeline definition is defined for each of the build server 230A-Z. Accordingly, for each build server 230A-Z, the execution management component 227 may generate a data structure associated with each build server (e.g., 230A-Z) as it is added. After the data structure associated with the added build server (e.g., build 230A) is generated, the execution management component 227 adds an entry to a CI/CD pipeline mapping table 220 stored in storage 203 with the build server identification (e.g., build 230A) and the corresponding data structure. As previously described, the data structure associated with the newly added build server is generated by the execution management component 227 performing a dry execution of the newly added build server (e.g., 230A). As a result of the dry execution of the newly added build server (e.g., 230A), the data structure associated with the newly added build server (e.g., 230A) is {filename: A.yml, task: [2]}. As noted above, the playbook typically corresponds to a file that contains the series of task that are included in a playbook. Upon dry execution of the playbook, a data structure is generated starting with the file name of the playbook and each task the playbook is configured to execute. Referring to FIG. 2B, in which system 200 further including a build (e.g., project) 210 having a plurality of playbooks (e.g., playbook A-C) and each playbook having at least 3 task (e.g., 1-3, 4-6, and 7-9). Build 210 includes a change to a portion of the build (e.g., task 2 of playbook A). Accordingly, once a change is detected in build 210, the execution management component 227 analyzes build 210 to determine the level of change of the build 210. As previously described, the level of change may be at least one of: a file level (e.g., playbook level) or a block level (e.g., task level). In some embodiments, the level of change may also include line level. Upon analyzing build 210, the execution management component 227 determines that the level of change is task level according to a change to a task of a playbook (e.g., task 2 of playbook A). The execution management component 227 determines which data structure in the CI/CD pipeline mapping table 220 to select by determining which of the data structure is directed to playbook A and includes task level details to compare with the change to task 2 of playbook A. Accordingly, the execution management component 227 determines based on the level of change matching a data structure of a build which build server to select based on an identification of the build server (e.g., build server ID 230A and build server ID 230J) associated with the matching data structure. As previously described, more than one build server may be selected to execute the build 210.

As previously described, if more than one build server is selected, the execution management component 227 may set a predetermined number of build servers (e.g., 1) to execute the build (e.g., build 210). The predetermined number of build servers may be determined by users of the CI/CD system. In an embodiment, once the execution management component 227 sets the predetermined amount of build servers to execute the build, the execution management component 227 may return all possible build servers and choose the predetermined amount of build servers from all the possible build servers that can execute the build. Upon choosing of the predetermined amount of build servers from all the possible build servers, the execution management component 227 may, e.g., randomly choose the build servers, may choose the build servers in the order the change to the projected satisfies the respective data structure, choose the build servers based on a performance metric (e.g., lead time to production, number of bugs, defect resolution time, regression test duration, production downtime during deployment, etc.) of the candidate build servers. In another embodiment, as the execution management component 227 determines based on the level of change matching a data structure of a build which build server to select, the execution management component 227 add the build to a list of build servers until the predetermined number of build servers are reached and cease selecting any additional build servers that may execute build 210. Once the build server is selected, the execution management component 227 may execute the build 210 on at least one of the selected build servers.

Figure 3:
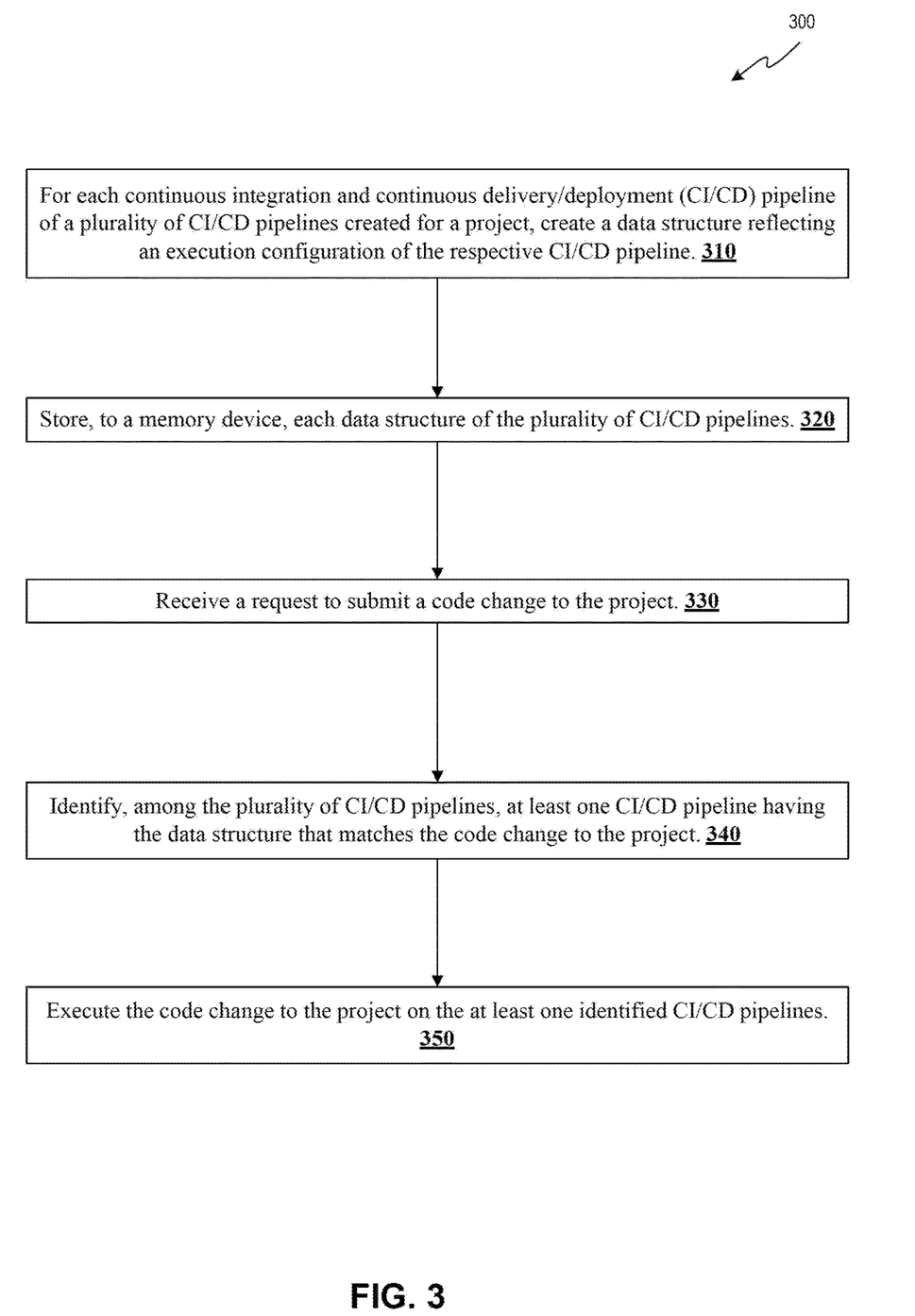
FIG. 3 depicts a flow diagram of an example method for selecting effective CI/CD pipeline based on dynamic CI/CD pipeline mapping, in accordance with one or more aspects of the present disclosure.

FIG. 3 depicts a flow diagram of an example method 300 for selecting effective CI/CD pipeline based on dynamic CI/CD pipeline mapping, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 300 may be performed by an execution management component, such as the execution management component 127 in FIG. 1. Alternatively, some or all of method 300 might be performed by another module or machine. It should be noted that blocks depicted in FIG. 3 could be performed simultaneously or in a different order than that depicted.

At block 310, for each continuous integration and continuous delivery/deployment (CI/CD) pipeline of a plurality of CI/CD pipelines associated with a project, the processing logic creates a respective data structure reflecting an execution configuration of the CI/CD pipeline. The execution configuration references at least one portion of the project to be executed by the respective pipeline. To create the data structure reflecting the execution configuration of the respective CI/CD pipeline, the processing logic populate the data structure based on an output of a dry execution of the respective CI/CD pipeline. As previously described, if the CI/CD pipeline is configured to execute, for example, an Ansible projects including playbooks, a dry execution of the CI/CD pipeline would result in the data structure being populated with: {file_name: X.yml; tasks: [1, 2, 3,]} In some embodiments, the project may be based on Ansible in which the execution configuration of a CI/CD pipeline is based on at least one of: a playbook, a task, and/or a line. Depending on the embodiment, the processing logic stores each CI/CD pipeline of the plurality of CI/CD pipelines and the corresponding created data structure to an entry of a CI/CD pipeline mapping table.

At block 320, the processing logic receives, by the processing device, a request to submit a code change to the project. The submitted code change to the project may be at least one of: a change to at least one portion of the project, an addition of at least one portion to the project, or a removal of at least one portion of the project.

At block 330, the processing logic identifies, among the plurality of CI/CD pipelines, at least one CI/CD pipeline having the data structure that matches the code change to the project. To identify, among the plurality of CI/CD pipelines, the at least one CI/CD pipeline having the data structure that matches the code change to the project, the processing logic, determines whether each portion of the code change to the project is included in a data structure associated with the respective CI/CD pipeline. As described previously, the processing logic analyzes the code change to the project to determine the level of change of the code change to the project. Once the level of change of the code change to the project is determined, the processing logic queries the CI/CD pipeline mapping table and compares the determined level of change with each data structure in the CI/CD pipeline mapping table to determine if the data structure encompass the determined level of change. Upon determining that the data structure associated with at least one CI/CD pipeline encompass the determined level of change, the processing logic sets the at least one CI/CD pipeline to execute the code change to the project.

At block 340, the processing logic executes the code change to the project on the at least one identified CI/CD pipelines. To execute the code change to the project on the at least one identified CI/CD pipelines, the processing logic limits execution of the code change to a predetermined number of the at least one identified CI/CD pipelines.

Executing the code change to the project may include performing, for example, one or more testing tasks according to the CI/CD pipeline definition of the at least one identified CI/CD pipeline. Limiting execution of the code change to a predetermined number of the at least one identified CI/CD pipelines may include setting the predetermined number of CI/CD pipelines to execute the code change to the project. As described previously, the processing logic may return the first predetermined number of CI/CD pipelines of the at least one identified CI/CD pipelines after obtaining all the at least one identified CI/CD pipelines or until the predetermined number of CI/CD pipelines are reached.

In some embodiments, responsive to updating the execution configuration of at least one CI/CD pipeline of the plurality of CI/CD pipelines, the processing logic updates the data structure of the at least one CI/CD pipeline reflecting the updated execution configuration. Updating the execution configuration of the at least one CI/CD pipeline of the plurality of CI/CD pipelines is the result of updating the pipeline definition of the at least one CI/CD pipeline. To update the data structure of the at least one CI/CD pipeline, the processing logic performs another dry execution of the at least one CI/CD pipeline having the updated pipeline definition and updates the data structure with the results of the dry execution.

Figure 4:
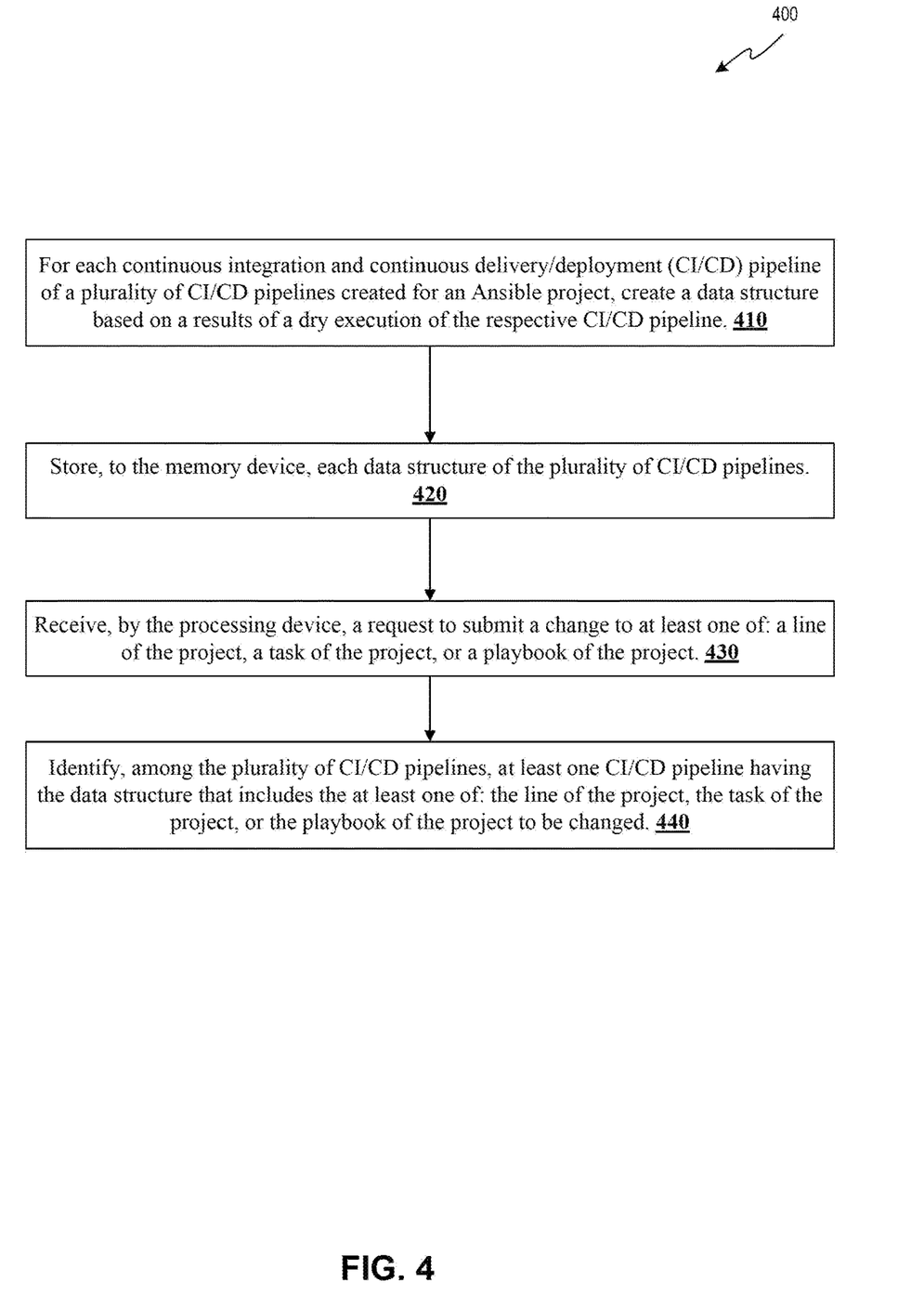
FIG. 4 depicts a flow diagram of an example method for selecting effective CI/CD pipeline based on dynamic CI/CD pipeline mapping, in accordance with one or more aspects of the present disclosure.

FIG. 4 depicts a flow diagram of an example method 400 for selecting effective CI/CD pipeline based on dynamic CI/CD pipeline mapping, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 400 may be performed by an execution management component, such as the execution management component 127 in FIG. 1. Alternatively, some or all of method 400 might be performed by another module or machine. It should be noted that blocks depicted in FIG. 4 could be performed simultaneously or in a different order than that depicted.

At block 410, for each continuous integration and continuous delivery/deployment (CI/CD) pipeline of a plurality of CI/CD pipelines created for an Ansible project, the processing logic creates a data structure based on a results of a dry execution of the respective CI/CD pipeline. As previously described, since the CI/CD pipeline is configured to execute Ansible projects including playbooks, a dry execution of the CI/CD pipeline would result in the data structure being populated with: {file_name: X.yml; tasks: [1, 2, 3,]} Thus, the execution configuration of a CI/CD pipeline is based on at least one of: a playbook, a task, and a line.

At block 420, the processing logic stores, to the memory device, each data structure of the plurality of CI/CD pipelines. To store each data structure of the plurality of CI/CD pipelines to the memory device, the processing logic stores each CI/CD pipeline of the plurality of CI/CD pipelines and the corresponding created data structure to an entry of a CI/CD pipeline mapping table stored in the memory device.

At block 430, the processing logic receives, by the processing device, a request to submit a change to at least one of: a line of the project, a task of the project, or a playbook of the project. The submitted change to the project may be at least one of: a change to at least one line, task, or playbook of the project, an addition of at least one line, task, or playbook of the project to the project, or a removal of at least one line, task, or playbook of the project.

At block 440, the processing logic identifies, among the plurality of CI/CD pipelines, at least one CI/CD pipeline having the data structure that includes the at least one of: the line of the project, the task of the project, or the playbook of the project to be changed. To identify, among the plurality of CI/CD pipelines, the at least one CI/CD pipeline having the data structure that includes the at least one of: the line of the project, the task of the project, or the playbook of the project to be changed, the processing logic, determines whether the line, task, or playbook of the change is included in data structure of the respective CI/CD pipeline. As described previously, the processing logic analyzes the change to the line, task, or playbook of the project to determine the level of change. Once the level of change is determined, the processing logic queries the CI/CD pipeline mapping table and compares the determined level of change with each data structure in the CI/CD pipeline mapping table to determine if the data structure encompass the determined level of change. Upon determining that the data structure associated with at least one CI/CD pipeline encompass the determined level of change, the processing logic sets the at least one CI/CD pipeline to execute the change to the line, task, or playbook of the project.

In some embodiments, the processing logic executes the change to the at least one of: the line of the project, the task of the project, or the playbook of the project on the at least one identified CI/CD pipelines. To execute the change to the at least one of: the line of the project, the task of the project, or the playbook of the project on the at least one identified CI/CD pipelines, the processing logic limits execution to the change to at least one of: the line of the project, the task of the project, or the playbook of the project on the at least one identified CI/CD pipelines to a predetermined number of the at least one identified CI/CD pipelines. Limiting execution of the change to the line, task, or playbook of the project to a predetermined number of the at least one identified CI/CD pipelines may include the processing logic setting the predetermined number of CI/CD pipelines to execute the change to the line, task, or playbook of the project. As described previously, the processing logic may return the first predetermined number of CI/CD pipelines of the at least one identified CI/CD pipelines after obtaining all the at least one identified CI/CD pipelines or until the predetermined number of CI/CD pipelines are reached.

In some embodiments, responsive to updating at least one CI/CD pipeline of the plurality of CI/CD pipelines, the processing logic updates the data structure of the at least one CI/CD pipeline based on a dry execution of the at least one updated CI/CD pipeline. As previously described, updating the execution configuration of the at least one CI/CD pipeline of the plurality of CI/CD pipelines is the result of updating the pipeline definition of the at least one CI/CD pipeline. To update the data structure of the at least one CI/CD pipeline, the processing logic performs another dry execution of the at least one CI/CD pipeline having the updated pipeline definition and updates the data structure with the results of the dry execution.

Figure 5:
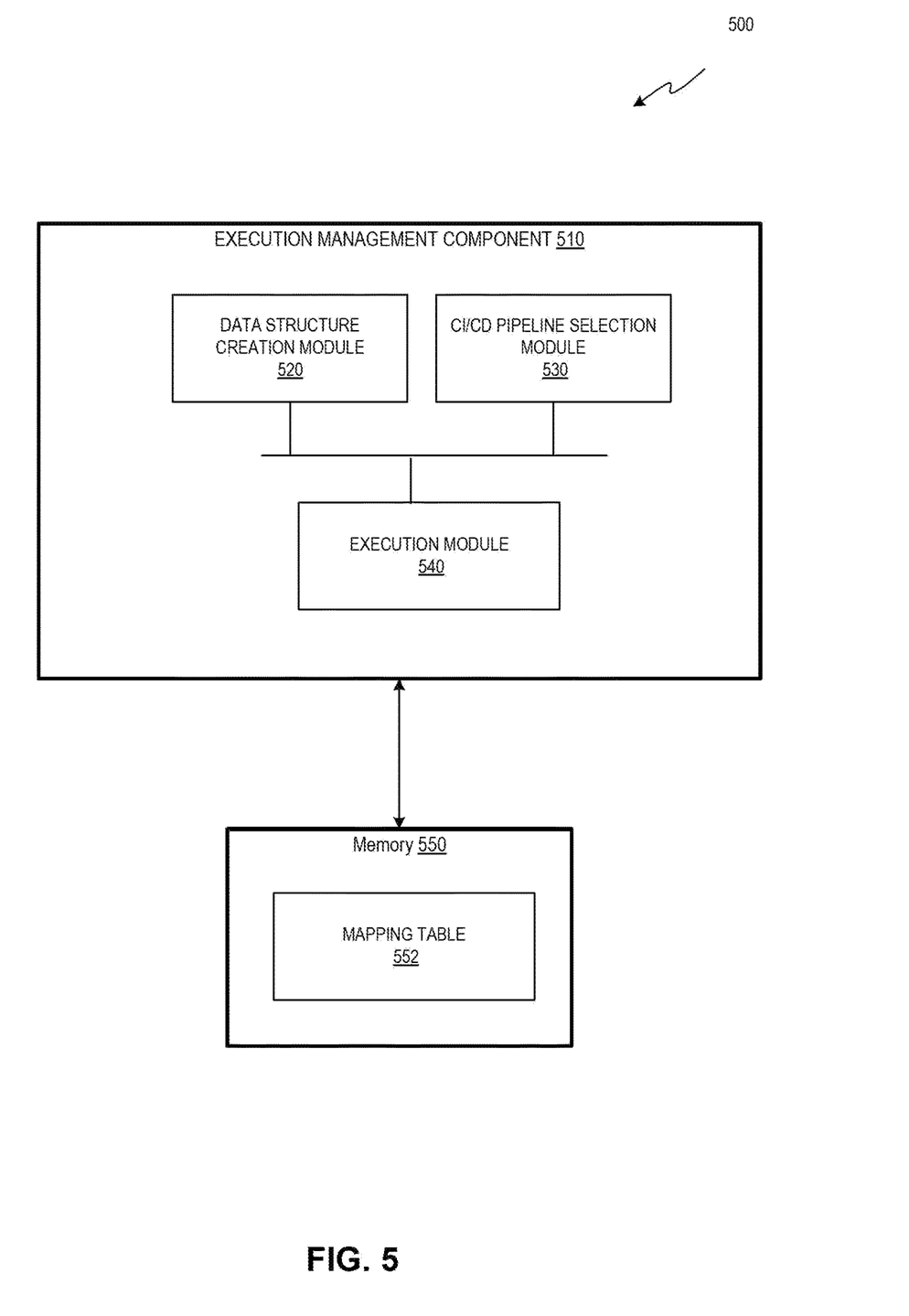
FIG. 5 depicts a block diagram of a computer system operating in accordance with one or more aspects of the present disclosure.

FIG. 5 depicts a block diagram of a computer system 500 operating in accordance with one or more aspects of the present disclosure. One or more of the components of FIG. 1 may execute on computer system 500. Computer system 500 may be the same or similar to client computer system 111 or build server 101A-D of FIG. 1, and may include one or more processors and one or more memory devices. In the example shown, computer system 500 may include a memory 550 and an execution management component 510 having a data structure creation module 520, a CI/CD pipeline selection module 530, and an execution module 540.

Data structure creation module 520 may, for each continuous integration and continuous delivery/deployment (CI/CD) pipeline of a CI/CD system created, generate a data structure associated with the CI/CD pipeline. As described previously, the data structure represents metadata indicating what the CI/CD pipeline executes (e.g., execution properties and/or an execution configuration) and specifies an execution configuration at a granular level with respect to the CI/CD pipeline. The data structure creation module 520 generates the data structure by performing a dry execution of the respective CI/CD pipeline as a result the data structure is populated with a representation of the underlying programming language of the CI/CD pipeline. For example, based on the CI/CD being configured to execute Ansible projects, the data structure may be {file_name: X.yml; tasks: [1, 2, 3]}. The data structure creation module 520 may further store the CI/CD pipeline and its corresponding data structure in a mapping table 552 (e.g., CI/CD pipeline mapping table) in memory 540.

Depending on the embodiment, for each continuous integration and continuous delivery/deployment (CI/CD) pipeline of a CI/CD system updated, the data structure module 520, the data structure creation module 520 may update the data structure associated with the updated CI/CD pipeline to maintain an accurate representation of the execution configuration of the CI/CD pipeline by performing another dry execution of the updated CI/CD pipeline. Thus, the data structure will be updated with the results of the dry execution of the updated CI/CD pipeline.

CI/CD pipeline selection module 530 may, in response to receiving a change request including a change to the project, analyze the change to the project associated with the change request to determine a level of change of the change to the project. As described previously, the level of change may include at least one of: playbook level, task level, or line level. Accordingly, upon determining the level of change, the CI/CD pipeline selection module 530 selects a CI/CD pipeline from the mapping table 552. To select the CI/CD pipeline from the mapping table 552, the CI/CD pipeline selection module 530 queries the mapping table 552 to compare the determined level of change with each data structure in the mapping table 552 to determine if the level of change associated with the change to the project is encompassed by the data structure. Thus, if any data structure in the mapping table 552 encompasses the level of change associated with the change to the project, the CI/CD pipeline selection module 530 may set the CI/CD pipeline associated with the data structure that encompasses the level of change associated with the change to the project to execute the change to the project. In some embodiments, more than one CI/CD pipelines contains a data structure that encompasses the level of change associated with the change to the project, thus the CI/CD pipeline selection module 530 may set the more than one CI/CD pipelines to execute the change to the project.

Depending on the embodiment, if more than one CI/CD pipelines contains a data structure that encompasses the level of change associated with the change to the project, the CI/CD pipeline selection module 530 may set a predetermined number of CI/CD pipelines to execute the change to the project. In setting only the predetermined number of CI/CD pipeline to execute the change to the project, the CI/CD pipeline selection module 530 may determine which CI/CD pipelines of the more than one CI/CD pipelines to set to execute randomly or based on some performance indicator of the CI/CD pipeline, for example.

In some instances, the CI/CD pipeline selection module 530 may be unable to select a CI/CD pipeline from the mapping table 552 due to none of the data structure in the mapping table 552 encompassing the level of change associated with the change to the project. Accordingly, the CI/CD pipeline selection module 530 may notify the user that there are currently no CI/CD pipelines configured to properly test the change to the project, thus additional CI/CD pipelines and/or updated CI/CD pipelines are needed.

In one embodiment, the CI/CD pipeline selection module 530 may stop selecting CI/CD pipelines from the mapping table 552 to set to execute the change once the number of selected CI/CD pipelines reach the predetermined number of CI/CD pipelines to execute the change to the project.

Execution module 540 may, based on the CI/CD pipelines set to execute the change to the project, execute the change to the project on any CI/CD pipeline set to execute the change to the project. Depending on the embodiment, the execution module 540 may use any suitable conditions to choose which of the CI/CD pipelines set to execute the change to the project by the CI/CD pipeline selection module 530 to execute the change to the project.

Figure 6:
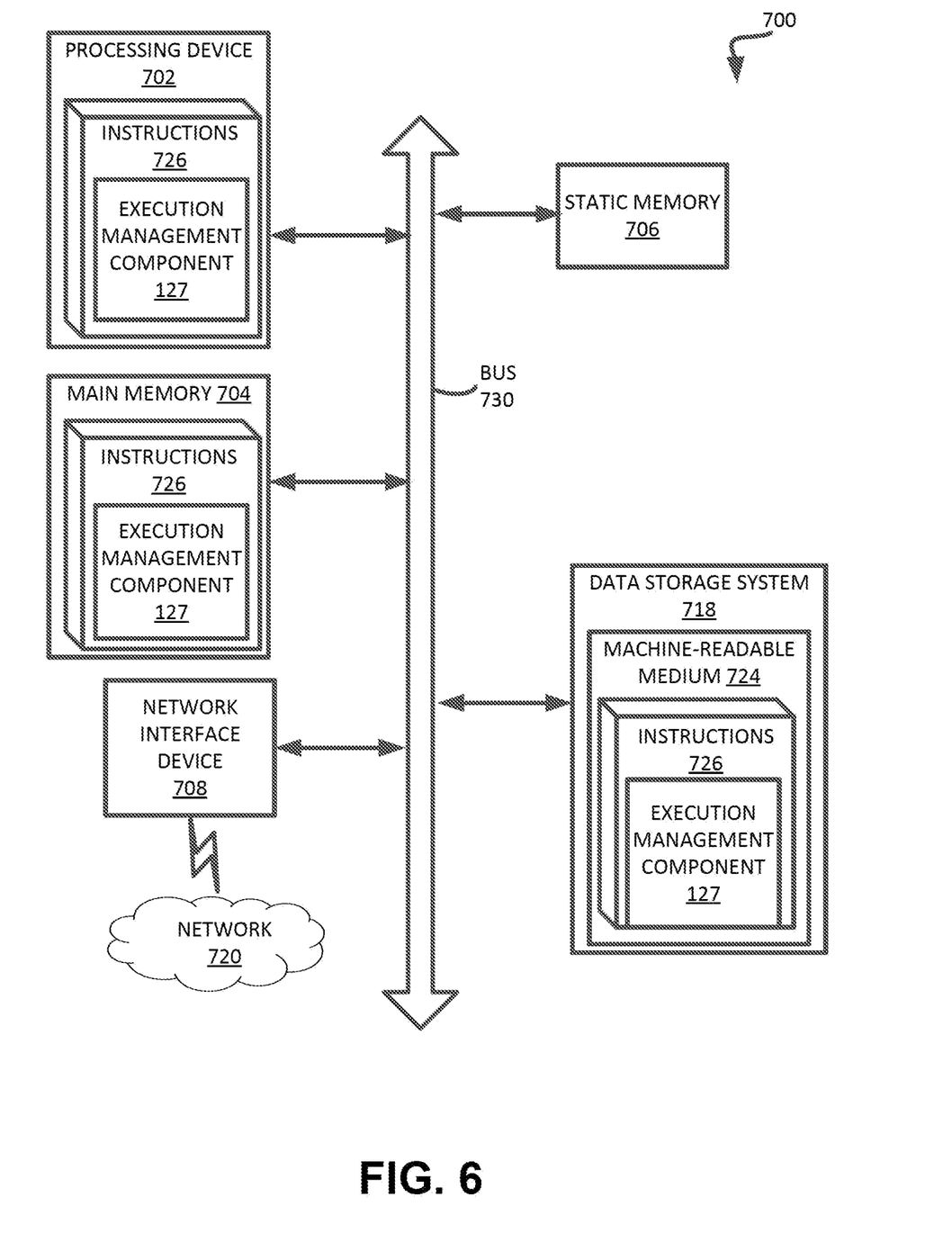
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 700 may correspond to computing environment 100 of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 400 and 600.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 6500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising:
a memory device; and
a processing device, operatively coupled with the memory device, to perform operations comprising:
for each continuous integration and continuous delivery/deployment (CI/CD) pipeline of a plurality of CI/CD pipelines associated with a project, creating a respective data structure reflecting an execution configuration of the CI/CD pipeline;
receiving, by the processing device, a request to submit a code change to the project;
identifying, among the plurality of CI/CD pipelines, at least one CI/CD pipeline having the data structure that matches the code change to the project; and
executing the code change to the project on the at least one identified CI/CD pipelines, wherein executing the code change to the project on the at least one identified CI/CD pipelines includes limiting execution of the code change to a predetermined number of the at least one identified CI/CD pipelines.

2. The system of claim 1, wherein the execution configuration references at least one portion of the project to be executed by the respective pipeline.

3. The system of claim 2, wherein creating the data structure reflecting the execution configuration of the respective CI/CD pipeline includes populating the data structure based on an output of a dry execution of the respective CI/CD pipeline.

4. The system of claim 1, wherein the operations further comprise:
responsive to updating the execution configuration of at least one CI/CD pipeline of the plurality of CI/CD pipelines, updating the data structure of the at least one CI/CD pipeline reflecting the updated execution configuration.

5. The system of claim 1, wherein the code change to the project is at least one of: a change to at least one portion of the project, an addition of at least one portion to the project, or a removal of at least one portion of the project.

6. The system of claim 5, wherein identifying, among the plurality of CI/CD pipelines, the at least one CI/CD pipeline having the data structure that matches the code change to the project includes determining whether each portion of the code change to the project is included in a data structure associated with the respective CI/CD pipeline.

7. The system of claim 1, wherein the execution configuration of a CI/CD pipeline is based on at least one of: a playbook, a task, or a line.

8. A method comprising:
for each continuous integration and continuous delivery/deployment (CI/CD) pipeline of a plurality of CI/CD pipelines associated with a project, creating a respective data structure reflecting an execution configuration of the CI/CD pipeline;
storing, to a memory device, each data structure of the plurality of CI/CD pipelines;
receiving a request to submit a code change to the project;
identifying, among the plurality of CI/CD pipelines, at least one CI/CD pipeline having the data structure that matches the code change to the project; and
executing the code change to the project on the at least one identified CI/CD pipelines, wherein executing the code change to the project on the at least one identified CI/CD pipelines includes limiting execution of the code change to a predetermined number of the at least one identified CI/CD pipelines.

9. The method of claim 8, wherein the execution configuration references at least one portion of the project to be executed by the respective pipeline.

10. The method of claim 9, wherein creating the data structure reflecting the execution configuration of the respective CI/CD pipeline includes populating the data structure based on an output of a dry execution of the respective CI/CD pipeline.

11. The method of claim 8, further comprising:
responsive to updating the execution configuration of at least one CI/CD pipeline of the plurality of CI/CD pipelines, updating the data structure of the at least one CI/CD pipeline reflecting the updated execution configuration.

12. The method of claim 8, wherein the code change to the project is at least one of: a change to at least one portion of the project, an addition of at least one portion to the project, or a removal of at least one portion of the project.

13. The method of claim 12, wherein identifying, among the plurality of CI/CD pipelines, the at least one CI/CD pipeline having the data structure that matches the code change to the project includes determining whether each portion of the code change to the project is included in a data structure associated with the respective CI/CD pipeline.

14. The method of claim 8, wherein the execution configuration of a CI/CD pipeline is based on at least one of: a playbook, a task, or a line.

15. A non-transitory computer-readable storage medium comprising instructions that, when executed by a processing device, cause the processing device to perform operations comprising:
for each continuous integration and continuous delivery/deployment (CI/CD) pipeline of a plurality of CI/CD pipelines created for an Ansible project, creating a data structure based on a results of a dry execution of the respective CI/CD pipeline;
storing, to a memory device, each data structure of the plurality of CI/CD pipelines;
receiving, by the processing device, a request to submit a change to at least one of: a line of the project, a task of the project, or a playbook of the project;
identifying, among the plurality of CI/CD pipelines, at least one CI/CD pipeline having the data structure that includes the at least one of: the line of the project, the task of the project, or the playbook of the project to be changed; and
executing the change to the at least one of: the line of the project, the task of the project, or the playbook of the project on the at least one identified CI/CD pipelines, wherein executing to the change to the at least one of: the line of the project, the task of the project, or the playbook of the project on the at least one identified CI/CD pipelines includes limiting execution the change to the at least one of: the line of the project, the task of the project, or the playbook of the project on the at least one identified CI/CD pipelines to a predetermined number of the at least one identified CI/CD pipelines.

16. The non-transitory computer-readable storage medium according to claim 15, further comprising:
responsive to updating at least one CI/CD pipeline of the plurality of CI/CD pipelines, updating the data structure of the at least one CI/CD pipeline based on a dry execution of the at least one updated CI/CD pipeline.

* * * * *